Jan. 18, 1955

R. L. MEEKS 2,699,571

SAUSAGE CASING CUTTER

Original Filed July 22, 1952

INVENTOR
Robert L. Meeks

BY Dodge and Sons

ATTORNEYS

United States Patent Office 2,699,571
Patented Jan. 18, 1955

2,699,571

SAUSAGE CASING CUTTER

Robert L. Meeks, Phoebus, Va., assignor of one-half to Charles M. Chambers, Phoebus, Va.

Original application July 22, 1952, Serial No. 300,168. Divided and this application August 18, 1952, Serial No. 305,013

1 Claim. (Cl. 17—1)

This invention relates to cutting means. Specifically it relates to a cutting means for use in slitting the casings of link sausage prior to removal of these casings.

Sausage casings made of soft pliable plastic tubing have come into extensive use in recent years. Such casings are inedible and it has been found desirable to remove them before the sausage is marketed. The present applicant and his co-inventor Charles M. Chambers filed an application for patent on a machine for removing these casings on July 22, 1952, bearing Serial No. 300,168, and the present application constitutes a division of that application. During the development of this machine various forms of cutters were experimented with, but their operations were not entirely satisfactory. The cutter to be described in the following specification was conceived by applicant to meet the requirements of that machine.

The invention will be described as it applied to that machine, but it should be understood that its use is not limited to this special application.

The cutter comprises a hinged support arranged above the endless conveyor of the machine referred to. Carried by this support is a generally cylindrical cutter body. This body is provided with a counterbore in one end. A cutting needle is received in this counterbore and clamped in place. A shroud is threaded onto the body and has an axial opening through which the needle projects.

The reasons for the superior operation of the cutter designed in accordance with this invention are not entirely understood. However, it is believed that one of the main advantages is the ability of the needle to cut without regard to the direction in which the casing is drawn across the needle. This permits the cutter to be unaffected by any movement of the casing transversely of the path along which it is drawn. This transverse component may result either from the sausages being curved or from any tendency which they have to roll on the conveyor by which they are carried past the cutter.

The superior operating characteristics may also be in part due to the fact that the cutting action appears to be quite closely limited to the needle point. This localization of the cutting action is mainly due to the adjustable shroud through which the needle projects but it may be due in part to the fact that sides of the needle are not formed as a knife edge. The sides of the needle would tear rather than cut the casings and it is believed possible that this tends to aid in confining the cutting action to the point of the needle. By confining the cutting action in this way it is possible to make a cut which is of a depth which can be made to correspond closely to the thickness of the casing.

The construction and operation of a cutter embodying the invention will be described having reference to the accompanying drawing in which Figure 1 is a fragmentary top plan view showing the cutter mounted on the machine described in the above identified copending application of Chambers and Meeks.

Figure 1:
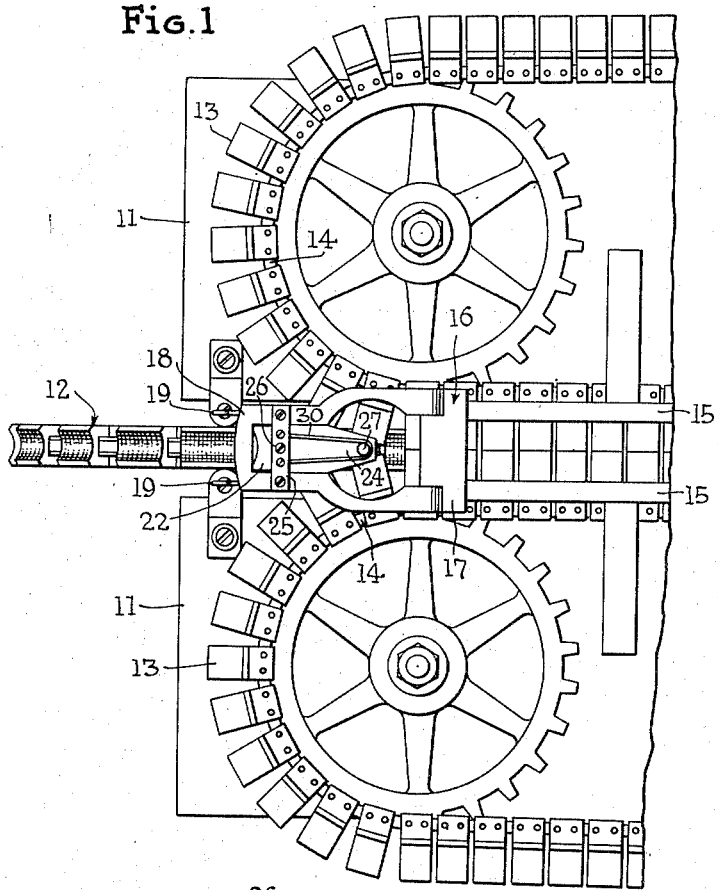
Figure 2:
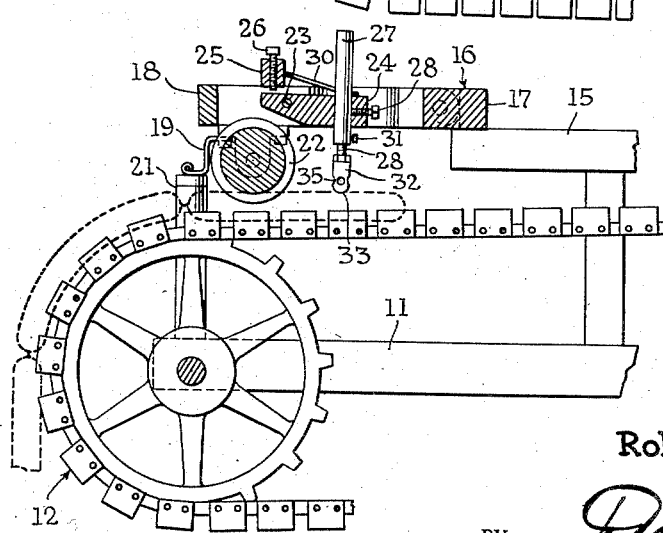
Figure 2 is a side elevation, partly in section, certain parts being omitted for clarity.

As shown in Figures 1 and 2, the machine for stripping the casings from the chain of link sausages comprises two spaced supports 11. An endless conveyor 12 is carried between these plates. Above the supports 11 are two traversing wiping mechanisms 13 each of which is carried by an endless belt 14.

The conveyor 12 is so arranged relatively to the traversing wiping mechanisms that the chain of link sausages follows an ascending path which brings the sausages into contact with the lower surfaces of the wiping means 13. The traversing wiping means are guided by a pair of spaced guideways 15 along a path which is related to the path of the main conveyor in a particular manner. For the purposes of the disclosure of the present invention it is not necessary that this relationship between the paths be elaborated.

Supported at the ends of the guideways 15 is a cutter supporting mechanism generally indicated by the numeral 16. This cutter supporting mechanism comprises a hinge plate 17 which extends transversely between the end of the guideways 15.

The hinge plate 17 affords a horizontal axis about which a generally U-shaped body member 18 is swingable. The free end of the body member 18 is sustained by a pair of flexible fingers 19 which are fastened thereto and which engage the guide rollers 21 located at the entrance end of the machine. A grooved roller 22 is carried by and beneath the body member 18 and engages the upper surface of the successive links of sausages when the machine is in operation. The flexible fingers 19 are effective to sustain the body 18 only when the machine is idle or when the sausages are of a diameter less than a predetermined amount.

A hinge pin 23 extends transversely between the legs of the body member 18 and a cutter supporting block 24 is journaled thereon. A stop member 25 also extends transversely between the legs of the member 18 and carries at its center an adjusting screw 26 which may be set to limit the rotation of the cutter supporting block 24.

A spring 30 biases the cutter block into engagement with the sausage casings and against the adjusting screw 26 whenever the machine is idle or when the sausages are undersize.

Figure 3:
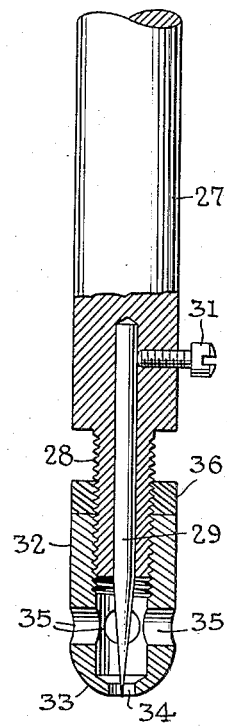
Figure 3 is a detail view of the needle and the lower portion of its mount.

A cylindrical cutter sustaining member 27 is slidable in a bore provided in the cutter supporting block 24. A set screw 28 is provided to permit locking of the member 27 in its adjusted position. The lower end of the member 27 is of a reduced diameter and screw threaded as indicated at 28. See particularly Fig. 3. A counterbore extends inwardly from the lower end of the member 27 and receives therein a cutting needle 29 which is secured in place by a radially directed set screw 31.

A shroud 32 is threaded onto the threads 28. This shroud 32 is generally cylindrical, but its outer end is hemispherical as is clearly indicated at 33. An opening 34 is provided which is axially alined with the needle 29. Relative movement of the shroud 32 and the member 27 controls the projection of the needle 29 through this opening. The shroud 32 is also provided with a series of radial ports 35. A lock nut 36 holds the shroud 32 in place after the shroud has been properly adjusted.

The operation of the device in the particular embodiment illustrated will probably be apparent from the physical construction of the cutter assembly. However, in the interest of a full disclosure its operation will be more fully developed.

As shown in Fig. 2, a chain of link sausage, indicated in dotted line, is carried by the conveyor 12 to a position directly beneath the cutting needle 29. The upper surface of the sausages is engaged by the grooved roller 22 which results in the U-shaped body member 18 being properly positioned relatively to the sausage casings. As the sausages are moved past the roller 22 by the conveyor 12, they are brought into contact with the hemispherical end 33 of the shroud and with the projecting point of the cutting needle 29. The continuing travel of the sausages results in the production of a longitudinal slit which extends from end to end of the casing.

The spring 30 and the weight of the assembly pivoted on the pin 23 biases the cutting needle 29 and the associated shroud 32 against the casing of the sausage with sufficient force to cause the needle to penetrate and cut the casing. The hemispherical end 33 of the shroud limits the downward motion of the needle under this bias and may be adjusted relatively to the member 27 so that the slit produced by the cutter is confined to the casing of the sausage and does not produce any cut in the filler therein. The ports 35 are provided to prevent the accumulation of foreign matter which might clog the shroud and interfere with the cutting action.

It will be apparent to those skilled in the art that a shrouded needle of this type could be employed to cut any membrane material. The particular construction is of advantage if the cut to be produced does not follow a straight line. The reason for this is that the needle has no directional characteristic such as would be found if a knife edge were used. In the particular machine disclosed in the copending application referred to, it permits the cutter to function properly regardless of any tendency which the sausages may have to roll on the surface of the conveyor 12 and is indifferent to longitudinal curvature of the surface of the sausages.

What is claimed is:

Means for slitting thin sheet material comprising in combination a shroud having a substantially hemispherical end, said end being provided with an aperture; and a needle mounted within the shroud, the tip or pointed end of the needle projecting through said aperture, and the needle and shroud being relatively adjustable to enable the projection of the needle to be varied.

References Cited in the file of this patent

UNITED STATES PATENTS

| Number | Name | Date |
|---|---|---|
| 306,413 | McArdle | Oct. 14, 1884 |
| 1,181,681 | Nicaud | May 2, 1916 |
| 2,224,892 | Allen | Dec. 17, 1940 |
| 2,269,616 | Yuhase | Jan. 13, 1942 |
| 2,288,670 | Babiary | July 7, 1952 |